(12) United States Patent
Thompson

(10) Patent No.: US 7,597,332 B2
(45) Date of Patent: Oct. 6, 2009

(54) MODULAR STROLLER

(75) Inventor: Julie Tabor Thompson, Cary, NC (US)

(73) Assignee: Hatch Design, Inc., Cary, NC (US)

( * ) Notice: Subject to any disclaimer, the term of this patent is extended or adjusted under 35 U.S.C. 154(b) by 425 days.

(21) Appl. No.: 11/481,271

(22) Filed: Jul. 5, 2006

(65) Prior Publication Data

US 2007/0045972 A1    Mar. 1, 2007

Related U.S. Application Data

(63) Continuation-in-part of application No. 10/570,581, filed as application No. PCT/US2004/028994 on Sep. 2, 2004, now Pat. No. 7,481,439.

(60) Provisional application No. 60/499,410, filed on Sep. 2, 2003, provisional application No. 60/696,986, filed on Jul. 6, 2005.

(51) Int. Cl.
  *B62B 7/00* (2006.01)
  *B62B 9/00* (2006.01)
  *B62D 39/00* (2006.01)
  *B62D 53/08* (2006.01)
  *A47C 3/04* (2006.01)
  *A47C 15/00* (2006.01)

(52) U.S. Cl. ............... 280/47.38; 280/408; 280/33.991; 280/33.992; 297/232; 297/239; 297/243

(58) Field of Classification Search ............ 280/33.991, 280/33.992, 47.38, 408; 297/232, 239, 243
See application file for complete search history.

(56) References Cited

U.S. PATENT DOCUMENTS 3,524,512 A * 8/1970 Barnowsky et al. ........ 180/14.1

| | | | |
|---|---|---|---|
| 4,222,132 A | | 9/1980 | Crim et al. |
| 4,484,755 A | * | 11/1984 | Houston ................ 280/33.992 |
| 4,805,938 A | * | 2/1989 | Redmond et al. ........ 280/47.35 |
| 4,969,656 A | | 11/1990 | Clausen |
| 5,064,209 A | | 11/1991 | Kurschat |
| 5,312,122 A | * | 5/1994 | Doty .................... 280/33.992 |
| D360,392 S | | 7/1995 | Lewandowski |
| 5,653,460 A | | 8/1997 | Fogarty |

(Continued)

FOREIGN PATENT DOCUMENTS

DE    41 33 503    4/1992

(Continued)

OTHER PUBLICATIONS

"Supplementary European Search Report," European Application No. EP 04 78 3292, Feb. 13, 2008, European Patent Office, Munich, Germany.

*Primary Examiner*—Christopher P Ellis
*Assistant Examiner*—John R Olszewski
(74) *Attorney, Agent, or Firm*—Coats & Bennett, P.L.L.C.

(57) ABSTRACT

A first and second stroller portions are described to form a modular stroller. The first and second stroller portions may be reversibly coupled together in a tandem relationship with a coupling device to operate in a double stroller configuration. Alternatively, the first and second stroller portions may be uncoupled from one another and used in an independent mode of operation.

18 Claims, 4 Drawing Sheets

U.S. PATENT DOCUMENTS

| | | |
|---|---|---|
| 5,887,935 A | 3/1999 | Sack |
| 5,918,892 A * | 7/1999 | Aaron et al. ............. 280/47.38 |
| 6,155,592 A | 12/2000 | Hsia |
| 6,523,840 B1 | 2/2003 | Koppes et al. |
| 6,527,294 B1 | 3/2003 | Brewington et al. |
| 6,752,405 B1 | 6/2004 | Wright |
| 6,938,906 B1 * | 9/2005 | Black ...................... 280/47.38 |

FOREIGN PATENT DOCUMENTS

| | | |
|---|---|---|
| DE | 42 02 428 | 8/1992 |
| EP | 1 162 122 | 12/2001 |
| GB | 2 368 824 | 5/2002 |

* cited by examiner

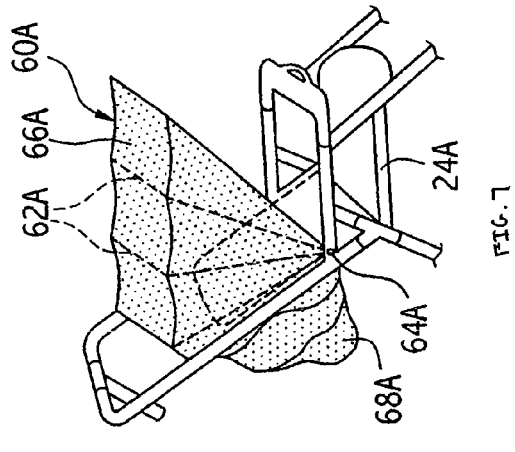
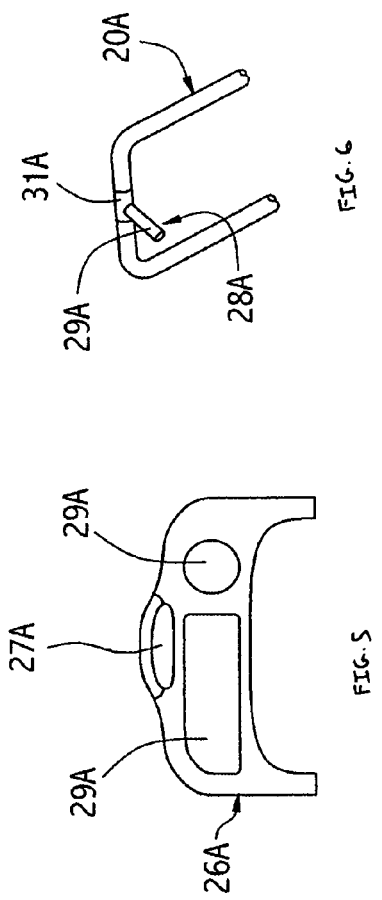
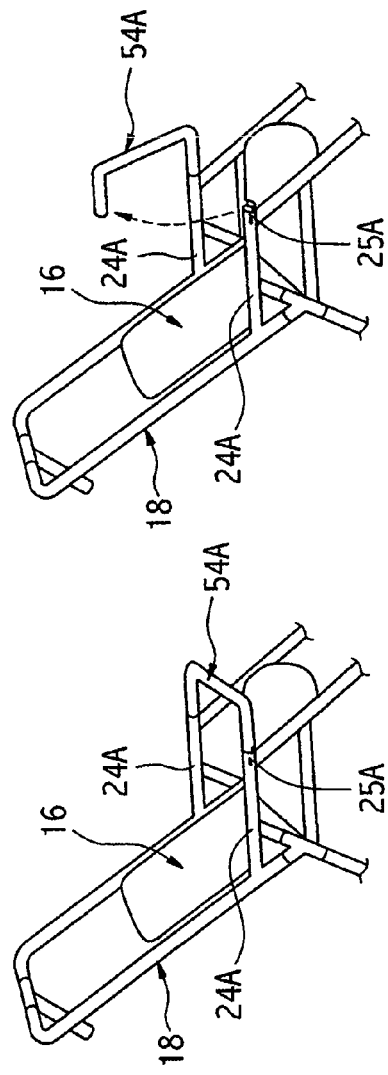

MODULAR STROLLER

CROSS REFERENCE TO RELATED APPLICATIONS

This application is a continuation in part of U.S. application Ser. No. 10/570,581, now U.S. Pat. No. 7,481,439, which is a national phase filing of PCT Application No. PCT/US04/28994, filed Sep. 2, 2004 and claims priority to U.S. Provisional Application No. 60/499,410 filed Sep. 2, 2003, and claims priority in part to U.S. Provisional Application No. 60/696,986 filed Jul. 6, 2005.

FIELD OF INVENTION

The present invention relates to a children's stroller. Specifically, the present disclosure relates to a convertible tandem double stroller.

BACKGROUND OF INVENTION

Double, triple and quadruple strollers for transporting 2, 3 and 4 children, respectively, at the same time are available as fixed stroller arrangements wherein the two seating areas of the stroller are in side-by-side or front-to-rear ("tandem") alignment. Exemplary strollers are disclosed in U.S. Pat. Nos. 5,221,106, 3,235,279, 2,993,702, 2,857,953 and 2,789,733. While such strollers are adequate for the transport of 2, 3 and 4 children, such permanent arrangements have several drawbacks. First, since the seating areas of the strollers are permanently attached to each other, the seating portions may not be separated from one another. This is disadvantageous in the situation when the parent or other operator of the stroller only has less children to transport than seats in the double triple or quadruple stroller, as such strollers are large, heavy and difficult to steer. Furthermore, such double, triple and quadruple strollers present certain economic disadvantages. For instance, in many cases a parent with more than 1 child may have purchased a single stroller for the first child. With the arrival of a second (or third, fourth, etc.) child and the purchase of a double, triple or quadruple stroller, the single stroller is no longer required.

It would therefore be advantageous if a stroller could be provided that could be adapted to transport a variable number of children depending on the needs of the parent or other operator. For instance, a double stroller could be provided that could alternate between the double stroller configuration and a single stroller configuration when desired. The present disclosure provides such stroller comprising a first stroller portion adapted to be reversibly coupled to a second stroller portion. The first and second stroller portions may be reversible coupled together for operation as a unit (such as, but not limited to, a double stroller) or the first and second stroller portion may be uncoupled and used separately. The first and second stroller portions could each be a single stroller or could each be a double stroller. Further more, one of the first or second stroller portions could be a single stroller, while the other of the first or second stroller portions could be a double stroller. Such a stroller, with the features described herein, was not heretofore available in the art.

BRIEF DESCRIPTION OF THE DRAWINGS

The invention will be better understood by reference to the accompanying drawings and the following detailed description wherein:

FIG. 5 is a top perspective view of one embodiment of the tray portion of the stroller;

FIG. 5B is a side view of one embodiment of the stroller described showing the reversible engagement of the arm portion;

FIG. 6 is a perspective view of one embodiment of the one-handed steering handle;

FIG. 7 is a side perspective view of one embodiment of the rotating awning;

FIG. 7B is a front perspective view of one embodiment of the toy bar attached to the interior of awning.

DETAILED DESCRIPTION OF THE INVENTION

Figure 1A:
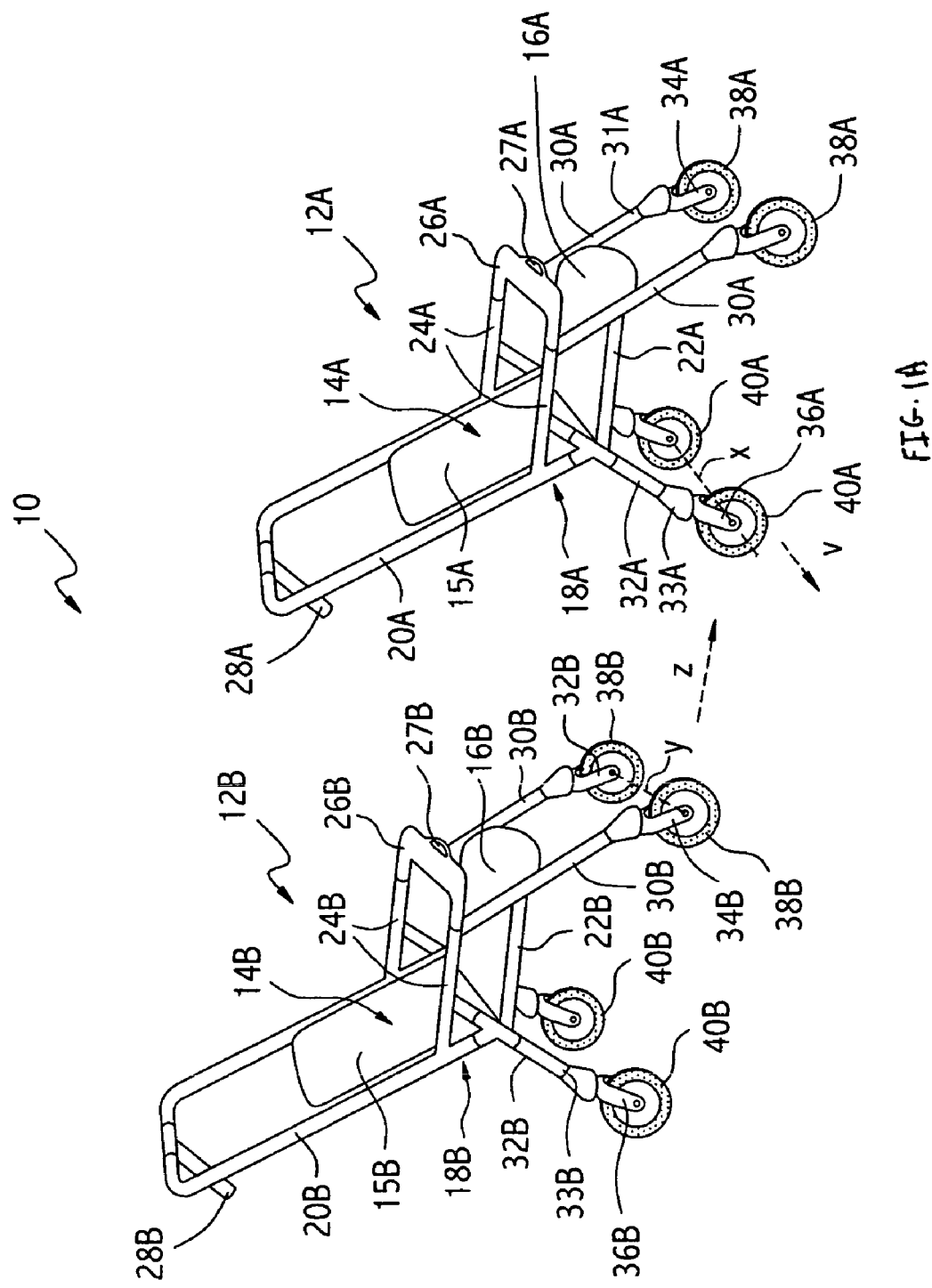
FIG. 1A illustrates one embodiment of the configuration of the first and second stroller portions.

The present disclosure provides a modular stroller capable of adapting between multiple configurations comprising a first stroller portion adapted to be reversibly coupled to a second stroller portion. The first and second stroller portions may be reversible coupled with one another by a coupling device when it is desired to operate the first and second stroller portions in a multiple stroller configuration, such as, but not limited to, a double stroller. The first and second stroller portions could each be a single stroller or could each be a double stroller. Further more, one of the first or second stroller portions could be a single stroller, while the other of the first or second stroller portions could be a double stroller. Therefore, the multiple configurations of the stroller described can be a double stroller, a triple stroller, or a quadruple stroller depending on the choice of the first and second stroller portions. As described below, the coupling device the first and second stroller portions allows for ease of maneuverability when the first and second stroller portions are coupled together. The coupling device is applicable regardless of whether the first and second stroller portions are single or double strollers. The operation of the described stroller in a multiple configuration allows a parent or other user of the stroller to transport 1 or more children depending on the needs of the situation.

Alternatively, by virtue of the reversible coupling, the first and second stroller portions may be uncoupled from one another so that the first and second stroller portions may be independently operated as single units. Independent operation of the first and second stroller portions may be used when two parents or other users are present to operate the first and second stroller portions, or when only 1 child is present and thus only 1 stroller is required. Such independent operation of the first and second stroller portions is advantageous in many situations. For example, the independent operation of the first and second stroller portions allows for easier manipulation and maneuverability since only one of the stroller portions is in operation. Furthermore, in many cases it may be advantageous for two users of the described double stroller to tend to separate tasks (such as may occur when shopping or attending to other errands). The independent operation of the first and second stroller portions allows the users to each take one child and tend to a specific task. Finally, the children being transported may simply desire to have their "own" stroller or to sit in the front, and the ability of the first and second stroller portions to operate in both a coupled configuration and an independent configuration allows a parent to satisfy such a desire.

The present disclosure provides in its most general form a first stroller portion having a configuration that allows a reversible coupling to a second stroller portion. In a specific form, the present disclosure provides a first stroller portion having a rear wheel configuration that is complementary with a front wheel configuration on a second stroller portion thereby allowing a reversible coupling of the first and second stroller portions.

In one embodiment, the first and second stroller portions are positioned for reversible coupling by placing the front wheels of the second stroller portion generally behind the rear wheels of the first stroller portion, such as in a tandem relationship. In this embodiment, the spacing between the rear wheels (the first wheel span) of the first stroller portion is (i) equal to or substantially equal to the spacing between the front wheels (the second wheel span) of the second stroller portion (i.e., the first wheel span is equal to or substantially equal to the second wheel span) or (ii) different than the spacing between the front wheels (the second wheel span) of the second stroller portion (i.e., the first wheel span is greater or lesser than the second wheel span). In an alternate embodiment, the first and second stroller portions are positioned for reversible coupling by placing the front wheels of the second stroller portion inside the distance between the rear wheels of the first stroller portion. In this embodiment, the spacing between the rear wheels (the first wheel span) of the first stroller portion different than the spacing between the front wheels (the second wheel span) of the second stroller portion (i.e., the first wheel span is greater or lesser than the second wheel span). As is obvious, the configuration may be reversed if desired with the rear wheels of the first stroller portion fitting inside the distance between the front wheels of the second stroller portion.

When the term wheel span is used in this specification, it is to be understood that the wheel span is measured from the center of one outermost wheel one side of the stroller portion to the center of the outermost wheel on the other side of the stroller portion. In the case of an embodiment where only a single wheel is present (such as the case where one of the stroller portions has a single wheel on the front or the rear of the stroller portion), the wheel span is measured from one edge of the tire to the other. Furthermore, by "substantially equal" it is meant the difference in spacing between the first and the second wheel spans is less than 5% or in an alternate embodiment, less than 10%.

Once the first and second stroller portions as positioned, the first and second stroller portions are reversibly coupled together by a coupling device or a linking element. In one embodiment, the linking element, such as, but not limited to, a bar, a platform or a fork coupling element. The linking element may be used when the first and second wheel spans are the same (or substantially the same) or when the first and second wheel spans are different. In a further embodiment, the coupling device is a rod that is inserted into a hollow axle portion of the front wheels of the second stroller portion and a hollow axle portion of the rear wheels of the first stroller portion. In an alternate embodiment, the rear wheels of the front stroller portion may contain a spring loaded rod or nub which is reversible received in a receiving hole on the front wheels of the rear stroller portion (as is obvious such a configuration could be reversed if desired). In yet another alternate embodiment of the means for coupling, the front wheels of the rear stroller portion could comprise securing rod or nub which are received by a receiving aperture or flanges located on the rear wheels of the first stroller portion (as is obvious such a configuration could be reversed if desired).

The reversible coupling of the first and second stroller portions provides a pivot point for the stroller when operated in the coupled mode which is located at the mid section of the tandem stroller. In prior art strollers, for example a double stroller, the position of the rear wheels served as the pivot point. The placement of the pivot point farther away from the handle portion of the described double stroller provides more leverage and results in a double stroller that is easier to turn and one having a smaller turning radius.

The described stroller is also more cost efficient than prior art multiple (i.e., double, triple or quadruple) strollers. By purchasing the described stroller, the parent or other user obviates the need to first purchase a single stroller for the first child and then purchase an additional stroller(s) for the subsequent child/children. Since the first and second stroller portions can be operated independently, the described first and second stroller portions could be purchased initially and the second stroller portion used when the need arises. Alternatively, the first and second stroller portions could be provided as individual units to a consumer, allowing the consumer to purchase the first stroller portion initially and then purchase the second stroller portion when the need arises. In this embodiment the coupling device could be provided with each stroller respectively (if the coupling device contained complementary or matching elements), or with the purchase of the second stroller portion or the coupling device could be provided as a separate unit itself.

As is obvious, such an adaptable stroller configuration will provide a user with greater versatility and convenience. The coupling device connecting the front wheels of the second stroller portion to the rear wheels of the first stroller portion may be easily and quickly removed when it is desired to use the first and second stroller portions independently. As will be described below, the coupling device may be stored in or on one of the first or second stroller portions when not in use, or the coupling device may simply be replaced in one of the first or second stroller portions in the same manner as if the coupling device was in use in reversibly coupling the first and second stroller portions together. In certain embodiments described herein, the coupling device does not involve removal of parts from the stroller and therefore no storage is required.

In addition, an adjustable handle is provided on at least one of the first or second stroller portions. This adjustable handle, in combination, with the pivot point location at the center of the described stroller in coupled mode, makes one handed steering and operation of the described double stroller possible. The first and second stroller portions described herein may also be provided with accessories common in the art for protecting and entertaining the child. For example, a rotating awning attached to the arms of the first and/or second stroller portions may provides greater coverage from the sun than awnings attached at the seat-back. For entertainment, a toy bar can be connected to the underside of the awning or to other components of the first or second stroller portions.

In the discussion below, reference is made to an embodiment of the described stroller where the first and second stroller portions are single strollers and the stroller in a coupled configuration is a tandem, double stroller. However, as described above, the first and second stroller portions could each be multiple (i.e., a double, triple or quadruple) stroller, or a combination of a single stroller and a multiple stroller and the described elements would operate in a similar manner.

Referring to the figures, where like reference numbers refer to like elements, a reversibly-coupled double stroller 10 is illustrated. In FIG. 1A double stroller 10 is illustrated and comprises a first stroller portion 12A and a second stroller portion 12B. The general configuration of the first 12A and second 12B stroller portions is essentially identical except as specifically stated herein and the elements thereof are referred to by the same reference numerals, with the suffix "A" referring to the first stroller portion 12A and the suffix "B" referring to the second stroller portion 12B. FIG. 1 shows the first 12A and second 12B stroller portions separate from one another before reversible coupling, with the arrow Z showing the direction of movement of the second stroller portion 12B so that the second stroller portion 12B can be aligned with the first stroller portion 12A for coupling to the first stroller portion 12A. The general configuration of the first stroller portion 12A will now be described, with the realization that the second stroller portion 12B contains like elements with like designations ending in the suffix "B".

The first stroller portion 12A comprises a seating area 14A supported by a frame 18A. The frame 18A comprises an upper frame portion 20A, a lower frame portion 22A at least one front wheel strut 30A and at least one rear wheel strut 32A, with all the components being in communication with one another. The front 30A and rear 32A wheel struts may further comprise a front wheel fork 34A and a rear wheel fork 36A, respectively, to support front 38A and rear 40A wheels. The seating area 14A comprises a backrest 15A and a seat 16A with appending leg rests and footrests supported by the upper 20A and lower 22A frame portions. The frame 18A may further comprise two armrest 24A coupled to the frame 18 (in the embodiment shown the armrest 24A is secured to the upper frame portion 20A). The exact configuration of the frame 18A and its components is not critical to the present disclosure as many variations may be considered within the scope of the disclosure and will not impact the operation of the described modular stroller. The specific embodiment illustrated is given by way of example of one possible configuration and should not be considered as limiting the appended claims in scope. Other arrangements of these elements are possible without departing from the spirit on the present disclosure. The armrest 24A may have a tray/bar 26A located at the front portion thereof. The tray 26A may be pivotally secured to one side of the armrest 24A and reversible secured to the opposite side of armrest 24A to allow the tray 26A to be raised and lowered, thereby facilitating placement of a child in the seating area 14A. The tray 26A may further comprise a cutout portion 27A to allow a user to grasp the first stroller portion 12A when needed. The cutout portion 27A may be conveniently shaped to conform to the contours of the user's hand. The upper end of the frame portion 20A is provided with an adjustable guiding handle 28A.

The frame 18A also comprises at least one front wheel strut 30A and at least one rear wheel strut 32A (in FIG. 1A two front wheel struts 30A and two rear wheel struts 32A are illustrated). The exact configuration of the attachment of the wheel struts 30A and 32A to the frame 18A is not critical to the present disclosure, with the embodiment shown being for illustrative purposes only. Other arrangements are possible without departing from the spirit on the present disclosure. Each of the front 30A and rear 32A wheel struts have a lower end 31A and 33A, respectively, which is coupled to a front wheel fork 34A and a rear wheel fork 36A, respectively. Each of the front 34A and rear 36A wheel forks support and secure at least one front wheel 38A and at least one rear wheel 40A, respectively. Alternatively, each of the front 34A and rear 36A wheel forks may support and secure two front wheels 38A and two rear wheels 40A, respectively. In such an embodiment, the two front 38A or the two rear wheels 40A may be each separated from one another by a space.

The coupling device may be a linkage element in communication with both the first and second stroller portions. In one embodiment, the linkage element is a bar secured to both the first 12A and second 12B stroller portions. In such embodiment, there may be one bar, two bars or more than two bars. However, in the embodiment illustrated, two bars are shown. The bar(s) may be permanently attached to one of the first 12A or second 12B stroller portions and reversible attached to the other. Alternatively, the bar(s) could be reversible attached to both the first 12A and second 12B stroller portions. The secure attachment of the bar(s) to either stroller portion 12A or 12B may be accomplished by a pivotal attachment such that the bar(s) may be moved to a convenient position when not in use. The reversible attachment may be accomplished by hooks, clamps and similar devices. The bar(s) may be attached to any part of the frame 18A or 18B of the first and second stroller portions. Furthermore, the bar(s) may be at least partially collapsible so that the bar may be stored more conveniently when not in use. Such a collapsible bar(s) may be a telescoping bar, as is known in the art. The bars may be used when the first and second wheel spans are the same/substantially the same or are different.

Figure 1B:
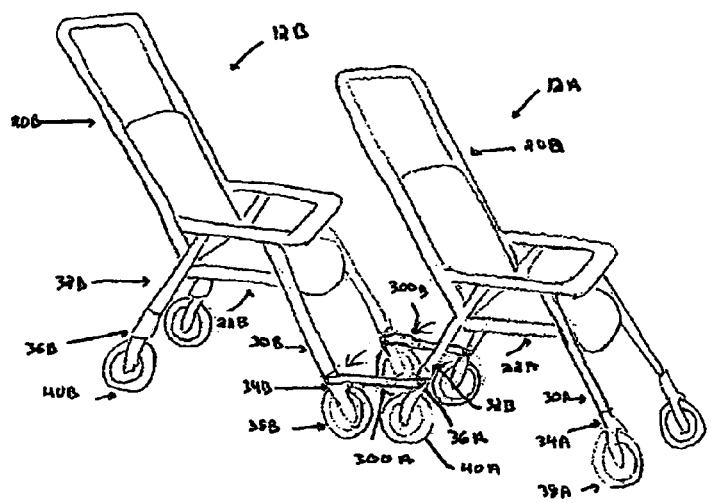
FIG. 1B illustrates one embodiment of the coupling device where the coupling device is a bar.
Figure 1C:
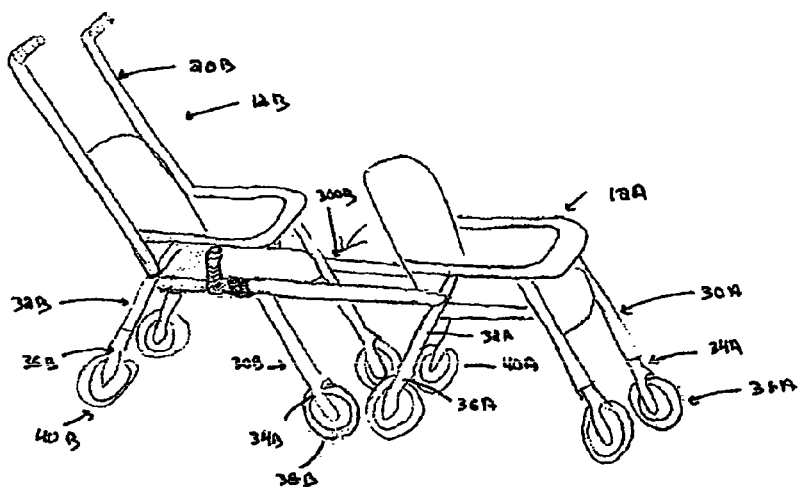
FIG. 1C illustrates an additional embodiment of the coupling device where the coupling device is a bar.

Two non-limiting embodiments of the bars are illustrated in FIGS. 1B and 1C. In FIG. 1B, the bars, designated 300A and B, extend between elements of the lower frame 22A of the first stroller portion 12A and the lower frame 22B of the second stroller portion 12B. The exact point of attachment is not critical; however, FIG. 1B shows the point of the attachment being the rear wheel strut 32A of the first stroller portion 12A and the front wheel strut 30B of the second stroller portion 12B. As described above, the bars 300A and B may be reversibly attached to each lower frame element or may be permanently attached to one frame element and reversible attached to the other frame element. In one embodiment where the bars 300A and B are permanently attached to one of the first 12A and second 12B stroller portions, the bars 300A and B may be pivotally attached such that the bars 300A and B may be stored against the frame when not in use. FIG. 1C shows an alternative embodiment of the arms 300A and B. In this embodiment, the bars 300A and B extend between elements of the upper frame 20A of the first stroller portion 12A and the upper frame 20B of the second stroller portion 12B. The exact point of attachment is not critical; however, FIG. 1B shows the point of attachment being the frame elements adjacent the seating areas 14A and 14B of the first 12A and second 12B stroller portions, respectively. As described above, the bars 300A and B may be reversibly attached to each lower frame element or may be permanently attached to one frame element and reversible attached to the other frame element. In one embodiment where the bars 300A and B are permanently attached to one of the first 12A and second 12B stroller portions, the bars 300A and B may be pivotally attached such that the bars 300A and B may be stored against the frame when not in use.

Figure 2A:
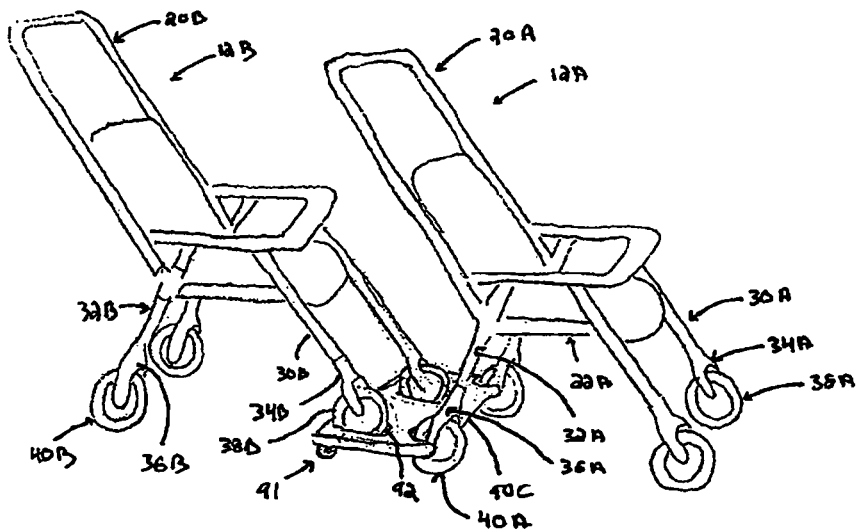
FIG. 2A illustrates one embodiment of the coupling device where the coupling device is a platform.
Figure 2B:
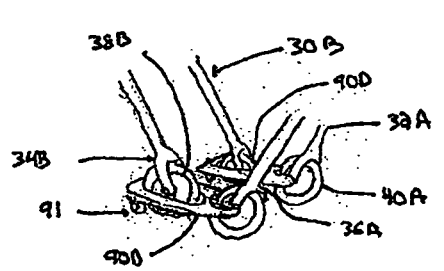
FIG. 2B illustrates an additional embodiment of the coupling device where the coupling device is a plurality of platforms.

In another embodiment, the linkage element is a platform secured to one of the first 12A or second 12B stroller portions and supporting the other of the first or second stroller portions. In one embodiment, a platform 90C may be provided as illustrated in FIGS. 2A and 2B. In the embodiment illustrated in FIG. 2A, the platform 90C is coupled to the rear wheel fork 36A of the first stroller portion 12A; however, the exact point of attachment of platform 90C is not critical to the present disclosure. The platform 90C may be supported by one or more wheels 91 as indicated if desired. The platform 90C may be reversible attached to the first 12A or second 12B stroller portions by any means, including those described herein or in U.S. patent application Ser. No. 10/570,581. For example a retractable element, such as retractable pin 200, may be used. Alternatively, the platform 90C may be pivotally secured to one of the first 12A or second 12B stroller portions. The platform may be used when the first and second wheel spans are the same/substantially the same or are different.

The front wheels 38B of the second stroller portion may be placed on the platform 90C. The platform 90C may have receiving element to receive the front wheels 38B of the second stroller portion 12B. In one embodiment, the receiving elements are straps, indentations, clamps or other means to secure the front wheels 38B to the platform 90C. In one embodiment, the platform 90C has indentations 92 to receive the front wheels 38B. The indentations 92 may extend partially or completely through platform 90C. In the embodiment where the indentations 92 extend through platform 90C, the front wheels 38B may touch the ground. When not in use, the platform 90C may be removed and stored. Furthermore, the platform 90C may receive only the front wheel struts 30B of the second stroller portion (the front wheels 38B and wheel forks 34B being removed before placing the front wheel struts 30B on the platform 90C)

As would be obvious to one of ordinary skill in the art, the configuration described above may be reversed with wheels 40A being received by the platform 90C. In the embodiment illustrated in FIG. 2B, two smaller platforms, each designated 90D are provided. The platforms 90D operate as described above for platform 90C. Each platform 90D may comprise wheels 91 for support if desired. In the various embodiments, the platform 90C and platform 90D can be located between, above, behind, or in front of wheels 38B of the second stroller portion 12B. These positions may cause the rear wheel structure of the first stroller portion 12A to be positioned in front of, next to, or behind the front wheel structure of the second stroller portion 12B in the tandem configuration.

Figure 3:
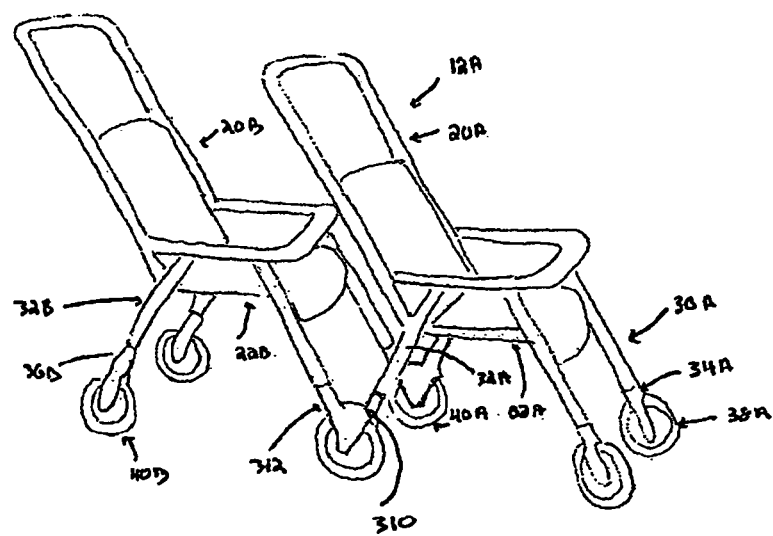
FIG. 3 illustrates an embodiment of the coupling device where the coupling device is a strut coupling element.

In yet another embodiment, the linkage element is a strut coupling element secured to one of the first 12A or second 12B stroller portions and supporting the other of the first or second stroller portions. In one embodiment, the strut coupling element 310 is part of the rear wheel fork 36A of the first stroller portion and comprises an element to receive the front wheel strut 32B of the second stroller portion 12B. in an alternate embodiment, the strut coupling element 310 takes the place of the rear wheel fork 36A of the first stroller portion and comprises an element to receive the rear wheel strut 34A of the first stroller portion and front wheel strut 32B of the second stroller portion 12B One embodiment of the strut coupling element 310 is shown in FIG. 3. In this embodiment, the strut coupling element 310 takes the place of rear wheel fork 36A of the first stroller portion 12A and supports rear wheel 40A of the first stroller portion 12A. The strut coupling element 310 comprises a receiving element 312 to receive the front wheel strut 30B of the second stroller portion 12B. The front wheel fork 34B may be removed from the front wheel strut 30B prior to coupling front wheel strut 30B to the strut coupling element 310. In this manner the first 12A and second 12B stroller portions are reversibly coupled. When desired to uncouple the first 12A and second 12B stroller portions, the front wheel forks 34B may be reattached to the front wheel struts 30B. The strut coupling element may be used when the first and second wheel spans are the same/substantially the same or are different. When the first and second wheel spans are different, the receiving element 312 may be angled to accommodate the difference.

As would be obvious to one of the ordinary skill in the art the configuration described above maybe reversed with the strut coupling element 310 forming a portion of the front wheel fork 34B of the second stroller portion or taking the place of front wheel fork 34B of the second stroller portion 12B.

In a further embodiment, the coupling device involves an extended wheel configuration as described below. In this embodiment, one of the first 12A or second 12B stroller portions comprises at least one wheel fork supporting 2 wheels with a cavity there between (referred to herein as an extended wheel configuration) to receive and secure at least one wheel of the other of the first or second stroller portions. In one embodiment, the cavity is just large enough to receive the wheel of the other stroller portion. The extended wheel configuration may be present on the rear wheel fork or the front wheel fork or both. In one embodiment, at least one of the rear wheel forks 36A of the first stroller portion 12A has the extended wheel configuration and the at least one front wheel fork 34B of the second stroller portion 12B comprise either a single wheel configuration or a double wheel configuration (which double wheel configuration may be an extended wheel configuration). Of course the opposite configuration could also be envisioned.

Figure 4:
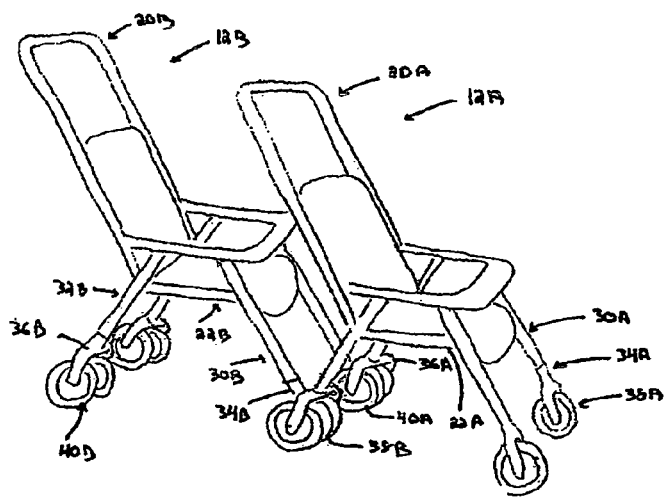
FIG. 4 illustrates an embodiment of the coupling device where the coupling device is a double wheel fork configuration.

One embodiment of the extended wheel configuration is shown in FIG. 4 where each of the rear wheel forks 36A and 36B comprise the extended wheel configuration. In one embodiment, the rear wheel forks 36A and 36B are generally U shaped with each leg of the U supporting a rear wheel 40A or 40B. A cavity 300 is located between the rear wheels 40A or 40B to receive a front wheel 38B. In the embodiment illustrated the front wheel 38B of the second stroller portion 12B is aligned with rear forks 36A of the first stroller portion 12A comprising the extended wheel configuration so that at least one of the front wheels 38B are received by the cavity 300. An alignment aid may be used as is known in the art (or described in U.S. patent application Ser. No. 10/570,581). The front wheels 38B may be reversible coupled within the cavity 300 using any methods described herein or known in the art (including those described in U.S. patent application Ser. No. 10/570,581). For example, a rod 100 with a suitable securing device (as described in U.S. patent application Ser. No. 10/570,581) could be used to secure the front wheel 38B within the cavity 300. The front wheels 38B of the second stroller portion 12B may be a single wheel or a double wheel configuration (which double wheel configuration may be an extended wheel configuration), provided that at least one of the front wheels 38B of the second stroller portion 12B is received within the cavity 300 of the first stroller portion 12A. As would be obvious to one of ordinary skill in the art, the configuration described above may be reversed so that the front wheel forks 34B or 34A comprising the double fork configuration with the operation being as described above.

A securing strap may also be used in combination with any of the embodiments of the present disclosure to further secure the first and second stroller portions to one another. The securing strap may be removably connected to both the first and second stroller portions or may be secured to one of the first or second stroller portions and be removably connected to the other of the first or second stroller portions.

Referring to FIGS. 5A and 5B, the tray is shown in greater detail. For simplicity, reference will be made to tray 26A of the first stroller portion 12A, with the understanding that the tray 26B of the second stroller portion 12B is of similar design. The tray 26A may have an arrangement of recesses, designated 29A, as is known in the art. Such an arrangement may be advantageous as it allows the child an area to place a bottle, juice cup or similar item. Furthermore, the tray 26A may comprise a cutout portion 27A to allow a user to grasp the first stroller portion 12A when needed. The cutout portion 27A may be conveniently shaped to conform to the contours of the user's hand. The cutout portion 27A may have a rubber grip. As shown in FIG. 5B, the tray 26A may be secured to a bar 54A by means known in the art. The bar 54A is pivotally secured to one of the armrests 24A at point 23A, but is reversible secured to the opposite armrest 24A by a latch mechanism 25A (which operates as is known in the art). This allows the tray 26A to be raised upward from a horizontal position across the front of first stroller portion 12A to a vertical position. Such operation is advantageous when a child is placed in or removed from the seating portion 14A.

Referring to FIG. 6, a one-handed steering handle is shown. For simplicity, reference will be made to steering handle 28A of the first stroller portion 12A, with the understanding that the steering handle 28B of the second stroller portion 12B is of similar design. Steering handle 28A is adjustably secured to the upper frame portion 20A of the frame 18A. The upper frame portion 20A may also be used as a handle to operate the stroller 10. In one embodiment, the steering handle 28A comprises a stem 29 and a tube portion 31A which wraps around the upper frame portion 20A. The steering handle may be adjustably secured to the upper frame portion 20A in several ways. In one embodiment, the interior of tube 31A is provided with a set of ridges on the internal surface, which mate with ridges on the external surface of the upper frame portion 20A. The interaction of the complementary ridge portions ensure that the handle remains in a selected position, but allow the user to apply sufficient force to adjust the steering handle 28A to the desired position. Alternatively, the upper frame portion 20A may be provided with a plurality of holes that interact with a knob, protrusion or similar device on the interior of tube 31A. A button or the like may be placed on the stem 29A that reversibly moves the knob between an extended and retracted position. When the button is depressed the knob may be retracted so that is does not engage one of the plurality of holes on the upper frame portion 20A, allowing the user to adjust the handle. When the button is released, the knob is extended and may extend into one of said holes and lock the steering handle 28A in place. The two embodiments described above may also be combined if desired. Other embodiments for moveably securing the steering handle 28A may also be envisioned and should be considered within the scope of this disclosure as the exact mechanism is not critical to the present disclosure.

Referring to FIGS. 7A and 7B, an extendable awning is shown. For simplicity, reference will be made to the extendable awning 60A of the first stroller portion 12A, with the understanding that the extendable awning 60B of the second stroller portion 12B is of similar design. Extendable awning 60A comprises a plurality of frames 62A that are each pivotally attached to the armrests 24A at a central point 64A. Fabric 66A is extended between and joined to the frames 62A to form the completed awning 60A. The awning 60A may be extended to an open position or collapsed to a closed position. The awning 60A may also be removable. An additional fabric portion 68A may be attached to the rear of the awning 60A to permit full coverage of the child when reclined in the first stroller portion 12A. Referring to FIG. 7B, a toy bar 70A is shown. The toy bar 70A may be attached to rings 72A which are located at a plurality of positions on the interior side of the awning 60A. Therefore, the height and position of the toy bar may be altered to suit the position of the child in the first stroller portion 12A.

When the first 12A and the second 12B stroller portions are reversible coupled in the tandem mode, the rear wheels 40B of the second stroller portion 12B will be in a swivel mode allowing the pivot point of the stroller to be in mid-section of tandem where the front wheels 38B of the second stroller portion and the rear wheels 40A of the first stroller portion are aligned. In a tandem mode, the front wheels 38B and the back wheels 40A are not able to swivel or pivot. As discussed above, such an arrangement allows for easier maneuverability of the stroller while in tandem mode. The front wheels 38A of the first stroller portion are also in swivel mode, meaning they are free to pivot.

When the first 12A and second 12B stroller portions are used independently of one another, the rear wheels 40A and 40B will be disengaged from swivel mode as is known in the art allowing the rear wheels 40A and 40B to be the pivot point of the first 12A and second 12B stroller portions. In the independent mode of operation, the front wheels 38A and 38B of the first 12A and second 12B stroller portions will be in swivel mode. In an alternate embodiment, where the first 12A and second 12B stroller portions are identical (and therefore interchangeable), the rear wheels 40A and 40B of the first 12A and second 12B stroller portions will be designed to switch from swivel mode to non-swivel mode as dictated by the mode of operation. Means to switch wheels from swivel to non-swivel mode are known in the art.

In the one embodiment, the first 12A and second 12B stroller portions will be foldable. Means to manufacture the first 12A and second 12B stroller portions in a manner in which they can be folded is known in the art. In an alternate embodiment the first 12A and second 12B stroller portions will not be foldable.

While the preferred embodiments of the invention have been described above, it will be recognized and understood that various modifications may be made therein and appended claims are intended to cover all such modifications which may fall within the spirit and scope of the invention. All patents and patent applications and other documents cited herein are hereby incorporated by reference as if fully set forth herein.

What is claimed:

1. A modular stroller comprising:
    a. a first stroller portion capable of independent use, said first stroller portion comprising a first frame and at least one rear wheel being mounted on a portion of said frame, and a first seat;
    b. a second stroller portion capable of independent use, said second stroller portion comprising a second frame and at least one front wheel and being mounted on a portion of said second frame, and a second seat; and
    c. a linkage element in communication with said first and second stroller portions to reversibly secure the first and second stroller portions in a tandem configuration;
    d. one of the at least one rear wheel and the at least one front wheel being elevated by the linkage element when in the tandem configuration;
    e. each of the first and second seats facing in a common direction when in the tandem configuration.

2. The stroller of claim 1 where the linkage element comprises at least one platform, said platform being secured to at least one of the first or second stroller portions and supporting the other of the first or second stroller portions.

3. The stroller of claim 2 where the platform is permanently secured to one of the first or second stroller portions or removably secured to one of the first or second stroller portions.

4. The stroller of claim 2 where the platform is hingedly secured to one of the first or second stroller portions.

5. The stroller of claim 2 where the platform further comprises at least one auxiliary wheel.

6. The stroller of claim 2 where the platform further comprises a receiving element.

7. The stroller of claim 6 where the receiving element receives a wheel or a wheel strut of the first or second stroller portion.

8. The stroller of claim 6 where the receiving element is selected from the group consisting of: a strap, an indentation and a clamp.

9. The stroller of claim 7 where the receiving element is an indentation.

10. The stroller of claim 9 where the indentation extends completely through the platform.

11. The stroller of claim 2 where the linkage element is two platforms, each of platforms being secured to at least one of the first or second stroller portions and supporting the other of the first or second stroller portions.

12. A modular stroller comprising:
   a. a first stroller portion capable of independent use, said first stroller portion comprising a first frame with a front wheel structure and a rear wheel structure, each mounted on a portion of said first frame;
   b. a second stroller portion capable of independent use, said second stroller portion comprising a second frame with a front wheel structure and a rear wheel structure, each being mounted on a portion of said second frame; and
   c. a coupling mechanism in communication with the first and second stroller portions to reversibly secure the first and second stroller portions in a tandem configuration with either the rear wheel structure of the first stroller portion or the front wheel structure of the second stroller portion positioned to contact the ground in the tandem configuration;
   d. the other of the rear wheel structure of the first stroller portion or the front wheel structure of the second stroller portion raised off the ground in the tandem configuration;
   e. each of the first and second stroller portions include seats that face forward in the tandem configuration.

13. The stroller of claim 12, wherein the rear wheel structure of the first stroller portion is positioned in front of the front wheel structure of the second stroller portion in the tandem configuration.

14. The stroller of claim 12, wherein the rear wheel structure of the first stroller portion is positioned behind the front wheel structure of the second stroller portion in the tandem configuration.

15. The stroller of claim 12, wherein the coupling mechanism is secured to one of the first frame and the second frame.

16. The stroller of claim 12, wherein the coupling mechanism includes complementary elements connected to each of the first and second frames.

17. A modular stroller comprising:
   a. a first stroller portion comprising a front wheel, a rear wheel, and a first seat with a bottom and a back,;
   b. a second stroller portion comprising a front wheel, a rear wheel, and a second seat with a bottom and a back, the second stroller portion capable of being merged into a tandem configuration with the first stroller portion; and
   c. a coupling mechanism configured to reversibly secure the first and second stroller portions in the tandem configuration with either the rear wheel of the first stroller portion or the front wheel of the second stroller portion elevated;
   d. each of the first and second seats positioned to face in the same direction in the tandem configuration.

18. The stroller of claim 17, wherein the first and second stroller portions in the tandem configuration are aligned in an end-to-end configuration with a longitudinal axis extending through the first and second seats and the rear wheel of the first stroller portion being offset along the longitudinal axis from the front wheel of the second stroller portion.

* * * * *

UNITED STATES PATENT AND TRADEMARK OFFICE
CERTIFICATE OF CORRECTION

PATENT NO.      : 7,597,332 B2                                        Page 1 of 1
APPLICATION NO. : 11/481271
DATED           : October 6, 2009
INVENTOR(S)     : Julie Tabor Thompson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 518 days.

Signed and Sealed this

Twenty-eighth Day of September, 2010

David J. Kappos
*Director of the United States Patent and Trademark Office*